United States Patent
Kierzenka et al.

(10) Patent No.: US 7,487,071 B2
(45) Date of Patent: Feb. 3, 2009

(54) PHYSICAL UNITS OF MEASURE IN MODELING LANGUAGES

(75) Inventors: Jacek Kierzenka, Framingham, MA (US); Nathan Brewton, Wayland, MA (US)

(73) Assignee: The MathWorks, Inc., Natick, MA (US)

( * ) Notice: Subject to any disclaimer, the term of this patent is extended or adjusted under 35 U.S.C. 154(b) by 332 days.

(21) Appl. No.: 11/221,191

(22) Filed: Sep. 6, 2005

(65) Prior Publication Data

US 2007/0055485 A1 Mar. 8, 2007

(51) Int. Cl.
*G06F 17/10* (2006.01)
(52) U.S. Cl. .............................. 703/2; 703/22; 345/418
(58) Field of Classification Search .................... 703/2, 703/22; 345/418
See application file for complete search history.

(56) References Cited

U.S. PATENT DOCUMENTS 6,983,227 B1 * 1/2006 Thalhammer-Reyero ....... 703/2

OTHER PUBLICATIONS

Morren et al., J. Model reduction and control of electronic interfaces of voltage dip proof DG units, IEEE Power Engineering Society, Jun. 2004, pp. 1-6.*
Domnisoru, Cristian, "Using MATHCAD in Teaching Power Engineering," *IEEE Transactions on Education*, vol. 48(1):157-161 (2005).
Humar, Iztok et al., "Mathematical tools for supporting Web-based education of electromagnetics," *Proceedings of the Fifth International Conference on Information Technology Based Higher Education and Training*, pp. 111-116 (2004).
International Preliminary Report on Patentability for Application No. PCT/US2006/034625, dated Dec. 14, 2007.

* cited by examiner

*Primary Examiner*—Russell Frejd
(74) *Attorney, Agent, or Firm*—Lahive & Cockfield, LLP; Kevin J. Canning

(57) ABSTRACT

The present invention provides intrinsic units of measure for modeling physical systems. Physical systems may then be modeled using the units of measure. As such, actual units, reflecting real world measurements, can be used and propagated through the modeled system yielding results having units of measure. In some embodiments, units of measure may also be checked to determine if they are compatible for a given operation. If units are not compatible, the user may then be notified that compatible units are required.

5 Claims, 5 Drawing Sheets

PHYSICAL UNITS OF MEASURE IN MODELING LANGUAGES

FIELD OF THE INVENTION

The present invention relates to a modeling environment for modeling a physical system. More particularly, the present invention relates to providing intrinsic units of measure for modeling physical systems.

BACKGROUND OF THE INVENTION

Many organizations are embracing the paradigm of Model Based Development in their production processes. "Model Based Development" refers to the practice of specifying, analyzing, and implementing systems using a common "model" consisting of a set of block diagrams and associated objects. System implementation typically consists of automatically generating code for portions of the model, particularly portions corresponding to the system's control algorithm.

Graphical modeling environments are an example of software applications that may enable a user to model dynamic systems i.e., systems whose outputs change over time, using a graphical model, such as a block diagram. Some graphical modeling environments also enable simulation and analysis of models. Simulating a dynamic system in a graphical modeling environment is typically a two-step process. First, a user creates a graphical model, such as a block diagram, of the system to be simulated. A graphical model may be created using a graphical user interface, such as a graphical model editor. The graphical model depicts time-based relationships between the systems inputs, states, parameters and outputs. After creation of the graphical model, the behavior of the dynamic system over a specified time period is simulated using the information entered into the graphical model. In this step, the graphical model is used to compute and trace the temporal evolution of the dynamic systems' outputs ("execute the graphical model"), and automatically produce either deployable software systems or descriptions of hardware systems that mimic the behavior of either the entire model or portions of the model (code generation).

Block diagrams are graphical entities having an "executable meaning" that are created within graphical modeling environments for modeling a dynamic system, and generally comprise one or more graphical objects. For example, a block diagram model of a dynamic system is represented schematically as a first collection of graphical objects, such as nodes, which are interconnected by another set of graphical objects, generally illustrated as lines, which represent logical connections between the first collection of graphical objects. In most block diagramming paradigms, the nodes are referred to as "blocks" and drawn using some form of geometric object (e.g., circle, rectangle, etc.). The line segments are often referred to as "signals". Signals correspond to the time-varying quantities represented by each line connection and are assumed to have values at each time instant. Each node may represent an elemental dynamic system, and the relationships between signals and state variables are defined by sets of equations represented by the nodes. Inherent in the definition of the relationship between the signals and the state variables is the notion of parameters, which are the coefficients of the equations. These equations define a relationship between the input signals, output signals, state, and time, so that each line represents the input and/or output of an associated elemental dynamic system. A line emanating at one node and terminating at another signifies that the output of the first node is an input to the second node. Each distinct input or output on a node is referred to as a port. The source node of a signal writes to the signal at a given time instant when its system equations are solved. The destination node of this signal read from the signal when their system equations are being solved. In other instances the connections between nodes are non-causal. That is, the line connecting the first node to the second node does not necessarily mean an output is being provided from the first node to the second node as an input. An example of non-causal connections can be found in electrical circuits in which there is no computational directionality. In physical systems, non-casual connections often imply that one set of variables are equal (such as voltage in an electrical circuit) while another set of variables sum to zero (such as current in an electrical circuit). Those skilled in the art will recognize that the term "nodes" does not refer exclusively to elemental dynamic systems but may also include other modeling elements that aid in readability and modularity of block diagrams.

Physical systems have fundamental dimensions such as length, mass, time, arc length, temperature, and charge. It is the unit associated with the value of these dimensions that gives the dimension meaning in the physical system by defining the quantity associated with the value of the dimension and their interactions, e.g. length (1 meter), time (1 second), velocity (1 meter per second). Presently there is no implementation of intrinsic units of measure in physical modeling systems in which the units of measure are fully validated and propagated throughout the system. That is, physical systems are currently modeled without having units of measure intrinsically associated with the values used. This can lead to problems, as entered values may have inconsistent units of measure. For example, one value may be in meters, such as 5 meters; while another value is in centimeters, such as 50 cm. Without the associated units of measure (m and cm) they are just values (5 and 50). Accordingly, adding such values, without associated units of measure, would result in an answer of 55. This would not be the correct answer for the addition of 5 meters and 50 centimeters which would be 5.5 meters or 550 centimeters. As one can see, units of measure can be crucial in making sure a system is accurately modeled.

SUMMARY OF THE INVENTION

The present invention provides intrinsic units of measure for modeling physical systems. Physical systems can then be modeled using the units of measure. As such, actual units, reflecting real world measurements, can be used and propagated through the modeled system yielding results having appropriate units of measure.

In accordance with a first aspect, in a physical modeling environment, a method is provided. The method comprises providing intrinsic units of measure; and modeling a physical system having units of measure.

In accordance with another aspect, a medium is provided for use with a computing device holding instructions executable by the computing device for performing a method. The method comprises providing intrinsic units of measure, and modeling a physical system having units of measure.

In accordance with another aspect, a system is provided for generating and displaying a physical modeling application. The system comprises user-operable input means for inputting data to the physical modeling application; a display device for displaying a physical model; and a computing device including memory for storing computer program instructions and data, and a processor for executing the stored computer program instructions, the computer program instructions including instructions for providing intrinsic units of measure and modeling a physical system having units of measure.

In accordance with another aspect, a system is provided for generating and displaying a physical modeling application. The system comprises a distribution server for providing to a client device, intrinsic units of measure for modeling physical systems; and a client device in communication with the distribution server.

In accordance with another aspect, in a network having a server, executing a physical modeling environment, and a client device in communication with the server, a method is provided. The method comprises the steps of providing, at the server, intrinsic units of measure; receiving, at the server from the client device, input having units of measure; and modeling a physical system having the units of measure.

DETAILED DESCRIPTION OF AN ILLUSTRATIVE EMBODIMENT

An illustrative embodiment of the present invention relates to implementing intrinsic units of measure in physical modeling environments. The present invention will be described relative to illustrative embodiments. Those skilled in the art will appreciate that the present invention may be implemented in a number of different applications and embodiments and is not specifically limited in its application to the particular embodiments depicted herein.

Intrinsic units of measure are provided for modeling physical systems. Physical systems can then be modeled using the units of measure. As such, actual units, reflecting real world measurements, can be used and propagated through the modeled system yielding results having units of measure.

Figure 1:
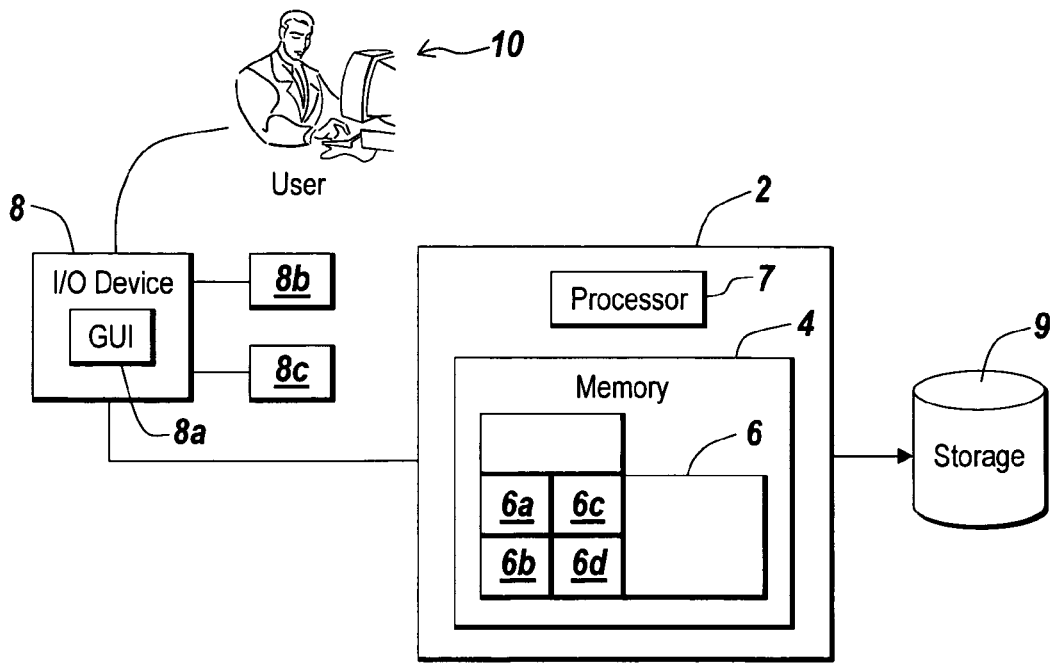
FIG. 1 illustrates an environment suitable for practicing an illustrative embodiment of the present invention.

FIG. 1 depicts an environment suitable for practicing an illustrative embodiment of the present invention. A computing device 2 includes memory 4, on which software according to one embodiment of the present invention is stored, a processor (CPU) 7 for executing software stored in the memory, and other programs for controlling system hardware. Typically, the interaction of a human user with the computing device 2 occurs through an input/output (I/O) device 8, such as a graphical user interface (GUI). The I/O device 8 may include a display device 8a (such as a monitor) and an input device (such as a mouse 8b and a keyboard 8c and other suitable conventional I/O peripherals.

For example, the memory 4 holds a modeling application 6 capable of creating and simulating digital versions of system models, such as block diagrams, state diagrams, signal diagrams, flow chart diagrams, sequence diagrams, UML diagrams, dataflow diagrams, circuit diagrams, ladder logic diagrams, kinematic element diagrams, or other models, which may be displayed to a user 10 via the display device 8a. In the illustrative embodiment, the modeling application 6 comprises a MATLAB modeling environment, such as Simulink® or another suitable modeling environment. As used herein, the terms "modeling environment" and "physical modeling environment" refer to an application where a model, such as a model of a physical system, is created and translated into executable instructions. Examples of suitable modeling applications include, but are not limited to MATLAB, including Simulink, SimMechanics, and SimDriveline from the MathWorks, Inc.; LabVIEW, DasyLab and DiaDem from National Instruments Corporation, VEE from Agilent, SoftWIRE from Measurement Computing, VisSim from Visual Solutions, SystemVIEW from Elanix, WiT from Coreco, Vision Program Manager from PPT Vision, Khoros from Khoral Research, and numerous others. The memory 4 may comprise any suitable installation medium, e.g., a CD-ROM, floppy disks, or tape device; a computer system memory or random access memory such as DRAM, SRAM, EDO RAM, Rambus RAM, etc.; or a non-volatile memory such as a magnetic media, e.g., a hard drive, or optical storage. The memory may comprise other types of memory as well, or combinations thereof.

In an alternate embodiment, the computing device 2 is also interfaced with a network, such as the Internet. Those skilled in the art will recognize that the diagrams used by the diagramming application 6 may be stored either locally on the computing device 2 or at a remote location 9 interfaced with the computing device over a network. Similarly, the diagramming application 6 may be stored on a networked server or a remote peer.

The modeling application 6 of an illustrative embodiment of the invention includes a number of generic components. Although the discussion contained herein focuses on MATLAB from The MathWorks, Inc. of, Natick Mass., those skilled in the art will recognize that the invention is applicable to other software applications. The generic components of the illustrative diagramming program 6 include a model editor 6a for specifying models of dynamic systems. The model editor 6a allows users to perform such actions as construct, edit, display, annotate, save, and print out a model that represents a physical system. The illustrative diagramming application 6 also includes elements libraries 6b that contain elements that may be combined to model systems. There may also be a graphical aspect 6c that allows graphical modeling. An execution engine 6d, also implemented in the application, is used to process a model to produce simulation results or to convert the model to executable code. The execution engine 6d translates a model to executable entities. The executable entities are compiled and executed on a computational device, such as a computer, to implement the functionality specified by the model. Typically, the code generation preserves a model hierarchy in a call graph of the generated code. For instance, each subsystem of a model in a physical modeling environment can map to a user specified function and the generated code. Real-Time Workshop from the MathWorks, Inc. of Natick, Mass. is an example of a suitable execution engine 6d for generating code.

In the illustrative embodiment, the modeling program 6 is implemented as a companion program to a technical computing program, such as MATLAB, also available from the MathWorks, Inc.

The model editor 6a is the component that allows a user to create and modify a model representing a physical system.

The model editor 6a also allows a user to create and store data relating to model element 6b. A textual interface with a set of commands allows interaction with the model editor. Using this textual interface, users may write special scripts that perform automatic editing operations on the model. A user generally interacts with a set of windows that act as canvases for the model. There is generally more than one window for a model because models may be partitioned into multiple hierarchical levels through the use of subsystems.

Once a model has been constructed using the editor 6a, the execution engine 6d simulates the model by solving equations defined by the model to trace the system outputs as a function of time. The solution of the model, which may be referred to as model execution, is carried out over a user-specified time span for a set of user-specified inputs.

Figure 2:
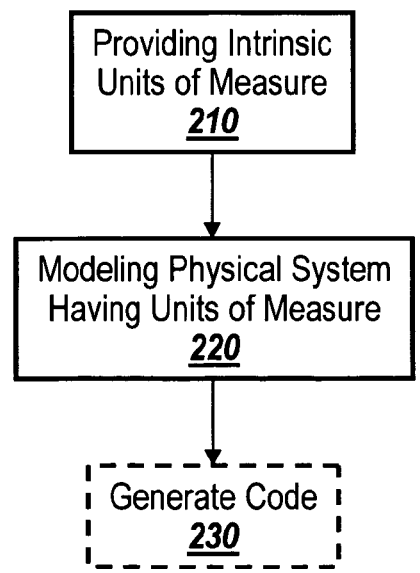
FIG. 2 is an exemplary flowchart of a process implementing intrinsic units of measure in a physical modeling environment.

According to an illustrative embodiment of the invention, physical systems having intrinsic units of measure can be modeled. FIG. 2 depicts an exemplary flow chart 200 of a method of the present invention. The method comprises the steps of providing intrinsic units of measure 210 and modeling a physical system having units of measure 220. In certain embodiments the method further comprises generating code from the model of the physical system 230.

One method of providing intrinsic units of measure (Step 210) comprises providing a unit database or registry. The database or registry may be provided in memory 4, as part of the modeling program 6, or in external storage 9. The unit database or registry is a list of registered units. The database or registry may contain fundamental units as well as user defined units. Using this database a user may register dimensions and their fundamental units. To register a dimension a function may be used such as:

---
adddimension ('length', 'm')
---

Here the dimension being registered is length having a fundamental unit of meters (represented by the symbol "m"). It should be noted that any number of dimensions may be registered in this manner. Other possible dimensions will be apparent to one skilled in the art given the benefit of this disclosure.

Similarly, a user may also register units with the database. To register a unit a function may be used such as:

---
addunit ('cm', 0.01, 'm')
---

Here the unit being registered is centimeters ("cm") which is defined as 0.01 meters ("m"). It should be noted that any number of units may be registered in this manner. Other possible units will be apparent to one skilled in the art given the benefit of this disclosure.

Thus, using these techniques, dimensions and units for a modeled physical system may be provided. An example of this may be seen below:

---
Function pm_units
%PM-UNITS - register units with physmod unit context
%
% Base Dimensions SI
%
pm_adddimension ('length', 'm');
```
-continued
```
pm_adddimension ('mass', 'kg');
pm_adddimension ('time', 's');
pm_adddimension ('charge', 'C');
pm_adddimension ('temperature', 'K');
%
% Derived SI length units
%
pm_addunit ('cm',    0.01,        'm');
pm_addunit ('mm',    1e-3,        'm');
pm_addunit ('km',    1000,        'm');
%
% Energy units
%
pm_addunit ('J',     1,           'kg*m^2/s^2');
pm_addunit ('Btu',   btu_2_J,     'J');
%
% Power units
%
pm_addunit ('W',     1,           'J/s');
pm_addunit ('HP',    735.4996249, 'W');
%
% Electrical units
%
pm_addunit ('V',     1,           'J/c');
pm_addunit ('A',     1,           'C/s');
pm_addunit ('F',     1,           'A*s/V');
pm_addunit ('H',     1,           'V*s/A');
pm_addunit ('Ohm',   1,           'V/A');
% [EOF] pm_units.m
---

In the above example, the dimensions of length, mass, time, charge, and temperature are registered with their respective fundamental units of meters (m), kilograms (kg), seconds (s), coulomb (c), and kelvin (K). Using these dimensions and fundamental units, derived length units, energy units, power units, and electrical units can be registered. As can be seen from the example above, compound units such as joules ($kg*m^2/s^2$) may also be supported.

Although the examples above use only the "adddimension" and "addunit" functions it should not be construed that these are the only possible functions. In some embodiments, for example, there may be a "cunit" and "unit" function. The "cunit" function may be used to bind unitless values to a unit. For example:

$a = cunit(4, \text{'m'})$ a=

4: m

The "unit" function may be used to provide unit information for a value with a unit. For example:

$a = unit(3, m')$;

$[u, e] = unit(a)$ u=

'm' e=

1

Other possible functions will be apparent to one skilled in the art given the benefit of this disclosure. In some embodiments an Application Programming Interface (API) may be used to add or remove units from the unit database or registry.

Using the above techniques, it is possible to define systems or domains. For example a function may be written to define the electrical domain. Such a function may look something like this:

```
function electrical (root, domain)
%ELECTRICAL - define the electrical domain
    $Author: batserve $
        v = domain.across_variable ('v');
        v.dimension  = [1 1];
        v.unit       = 'V';
        i = domain.through_variable ('i');
        i.dimension  = [1 1];
        i.unit       = 'A';
end
% [EOF] electrical.m
```

In this example, voltage (v) and current (i) are defined for the domain. Voltage and current are defined as arrays having units of volts (V) and amps (A) respectively. It should be apparent that the above function is just one many possible functions as well as just one of may possible domains that can be specified. Other possible functions and domains will be apparent to one skilled in the art given the benefit of this disclosure.

Similarly, components to be modeled in a physical system may be specified using intrinsic values. An example, a component such as a resistor may be specified textually using intrinsic units. Such an example may look like:

```
function resistor (root, schema)
%RESISTOR - models a linear resistor
    p = schema.terminal ('p');
    p.description  = 'Positive Terminal';
    p.domain       = root.electrical.electrical;
    n = schema.terminal ('n');
    n.description  = 'Negative Terminal';
    n.domain       = root.electrical.electrial;
    r = schema.parameter ('r');
    r.description  = 'Resistance';
    r.type         = ne_type ('real', [1 1], 'Ohm');
    schema.setup(@setup);
end
function setup (root, resistor)
    resistor.branch_across ( 'v', resistor.p.v, resistor.n.v);
    resistor.branch_through ('i', resistor.p.i, resistor.n.i);
    resistor.equation(@equation);
end
function e = equation (resistor)
    e(1) = resistor.v - resistor.r * restistor.i;
end
% [EOF] resistor.m
```

In this example, a resistor is specified textually, such that it has a positive terminal (p), negative terminal (n) and a resistance (r) having an intrinsic unit of ohms. The resistor has a voltage (v) across it and a current (i) through it. The interrelation of voltage, current and resistance is given in the equation e(1)=resistor.v−resistor.r * resistor.i. Here, the variable e(1) is driven to zero. In other words, the voltage across the resistor is equal to the resistance of the resistor times the current flowing though the resistor (v=r* i).

It should be apparent that the above function is just one of many possible functions as well as just one of many possible components or elements that can be specified. Other possible functions, components or elements will be apparent to one skilled in the art given the benefit of this disclosure.

Figure 3:
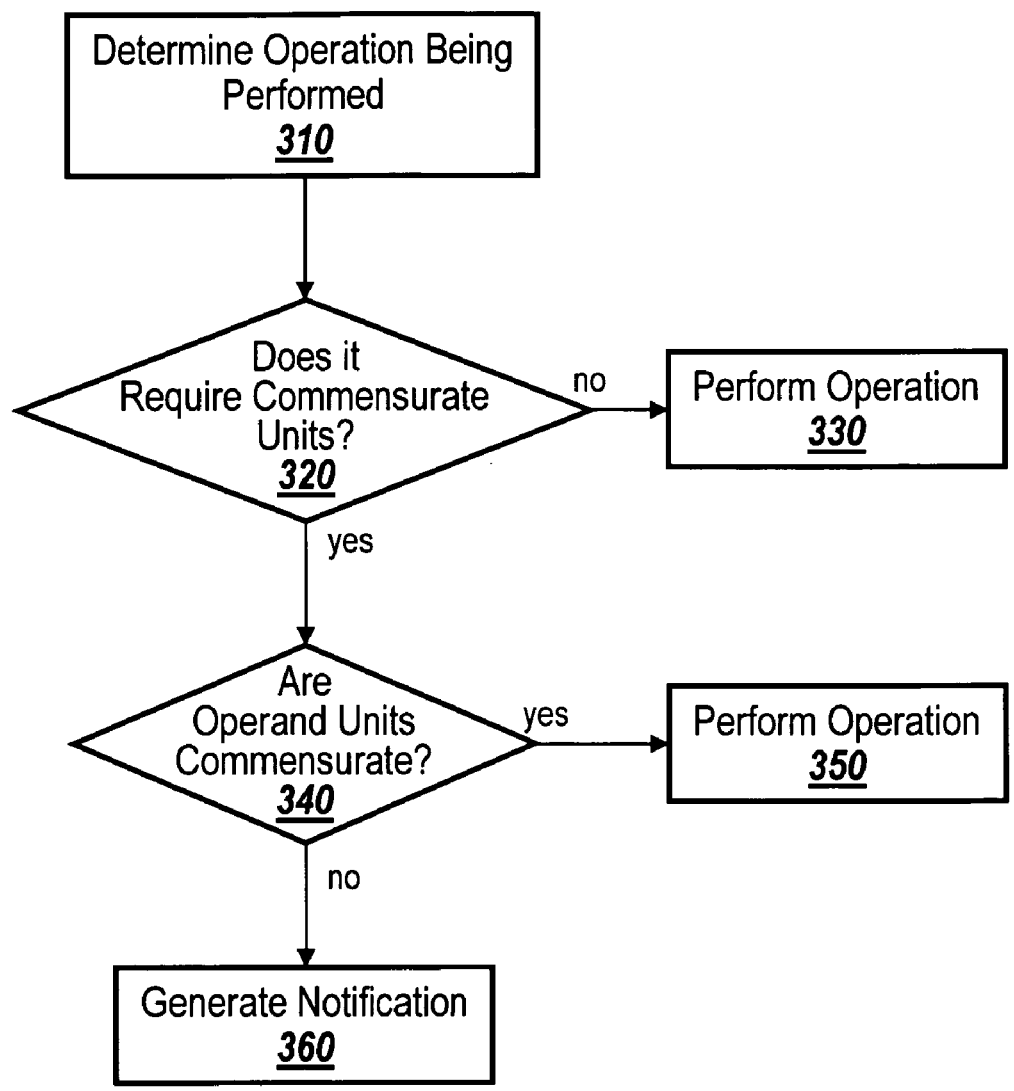
FIG. 3 is an exemplary flowchart of a process for checking if intrinsic units of measure are commensurate.

In another aspect of the invention, an implementation of intrinsic units allows for the checking of intrinsic units of measure to determine if they are commensurate. Because values can have intrinsic units of measure it is important to determine if an operation can be performed for given values having units of measure. For example, the function pm_units given above specified the dimensions of length and time as having an intrinsic unit of meters (m) and seconds (s) respectively. These dimensions have different intrinsic units of measure (meters and seconds) and as such are not necessarily compatible for certain operations. An exemplary flowchart 300 of how this may be performed can be seen in FIG. 3. Here the operation being performed is determined 310. The operation may be a simple operation such as add, subtract, multiply, or divide; or the operation may be a transform. It is then determined if the given operation requires commensurate units 320. It should be apparent that not all operations will have commensurate unit requirements. For example, multiplying and dividing do not require the units of the values to be the same. In some embodiments, operations requiring commensurate units may be determined by checking a database listing. If the operation does not require commensurate units then the operation may then be performed 330. If the operation does require commensurate units, the units of the operands are checked to determine if they are commensurate 340. For example, one cannot add values of time to values of distance because they are not commensurate. Again, in some embodiments, units can be checked by consulting the database to determine if they are compatible. If the units are commensurate, such as when adding meters to meters, the operation may then be performed 350. If the units are not commensurate then a notification may be generated 360. In operation, if a user were to attempt to add time and distance, such as:

$$a=cunit\ (4,\ 'm');$$

$$b=cunit\ (5,\ 's');$$

$$c=b+a$$

The user would receive a message in return indicating that the units are not commensurate such as:

??? units 'm' and 's' are not commensurate

This would indicate to the user that he or she needs to check the units to make sure they are commensurate for the desired operation. In certain embodiments, the user could be prompted or solicited as to how to address the non-commensurate units. As noted above, not all operations will have commensurate unit requirements. For example, distance (m) divided by time (s) results in velocity having a unit of meters per seconds (m/s).

Figure 4:
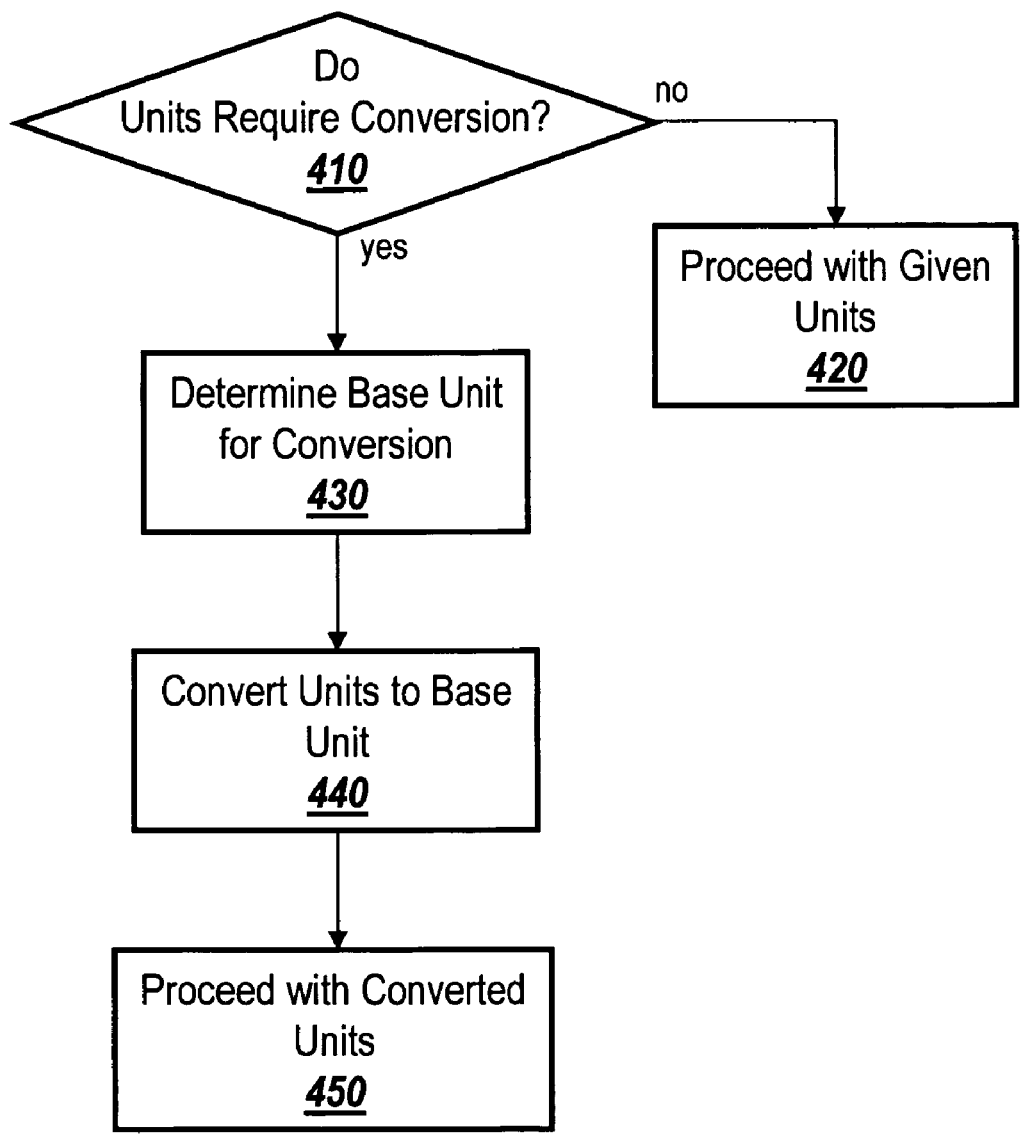
FIG. 4 is an exemplary flowchart of a process for converting intrinsic units of measure.

In another aspect of the invention, an implementation of intrinsic units allows for the conversion of units of measure. An exemplary flowchart 400 of how this may be performed can be seen in FIG. 4. This process may be performed as part of step 330 or 350 of FIG. 3. First, it is determined if units need conversion 410. If no conversion is required the system may proceed with the given units 420. If unit conversion is required, then the base unit for conversion must be determined. The units are then converted 440 and the system can proceed with the converted units 450.

In some embodiments units may need to be scaled. For example, the function pm_units given above specified the dimension of length as having an intrinsic unit of meters (m). The function pm_units also specified the unit of centimeters (cm) as being 0.01 meters. In order to add a value given in meters with a value given in cm, one of the values needs to be scaled so that the units match. In some embodiments the conversion may be based on the first operand of an operation.

For example, in an embodiment where scaling is provided, adding meters (m) and centimeters (cm) such as:

$a$=cunit (4, 'm');

$b$=cunit (5, 'cm');

$c$=$a$+$b$ yields a result provided in meters (m) as seen below:

$c$=4.05: m

Here, the units are converted to the base unit of meters. This methodology may also apply when there are multiple operands of different but commensurate units. For example:

$a$=cunit (4, 'm');

$b$=cunit (5, 'cm');

$c$=cunit (2, 'km');

$d$=$a$+$b$+$c$ $d$=2004.05: m

The scaling of units does not need to be based on the first operand. In certain embodiments the user may specify the base unit all other units are to scale to. In other embodiments, the conversion of units may be from one measurement scale to another, such as converting from English to Metric, i.e. from pounds (lb) to kilograms (kg). For example, the user may specify that all units be scaled to centimeters (cm).

In other embodiments, the conversion of units may be from one measurement scale to another, such as converting from English to Metric, i.e. from pounds mass (lbm) to kilograms (kg) For example, mass is most often given in kilograms, so the user may specify that all weight calculations be given in kilograms. Thus, assuming that pounds mass (lbm) have been specified in units of kilograms (kg) in the unit database, when adding masses having values of pounds mass, grams, and kilograms, the result will be provided in kilograms (kg).

In yet another embodiment, the conversion of units may be selected optimally so that round off error due to floating point arithmetic is reduced. Thus, all units are converted to the base unit that introduces the least amount of error due to rounding off in any floating point arithmetic that may be performed.

It also should be noted that any of these and other conversion techniques may be used in conjunction with one another. In some implementations some conversion techniques can be given priority over others. For example, minimizing round off error may be given priority over converting to a preferred base unit (such as kg).

Thus, in such a matter intrinsic units of measure may be propagated through a system. That is, once a value is assigned a unit of measure, that unit of measure plays into all the operations that may be performed from then on. This becomes particularly apparent when intrinsic values are used in graphical models of physical systems.

Figure 5:
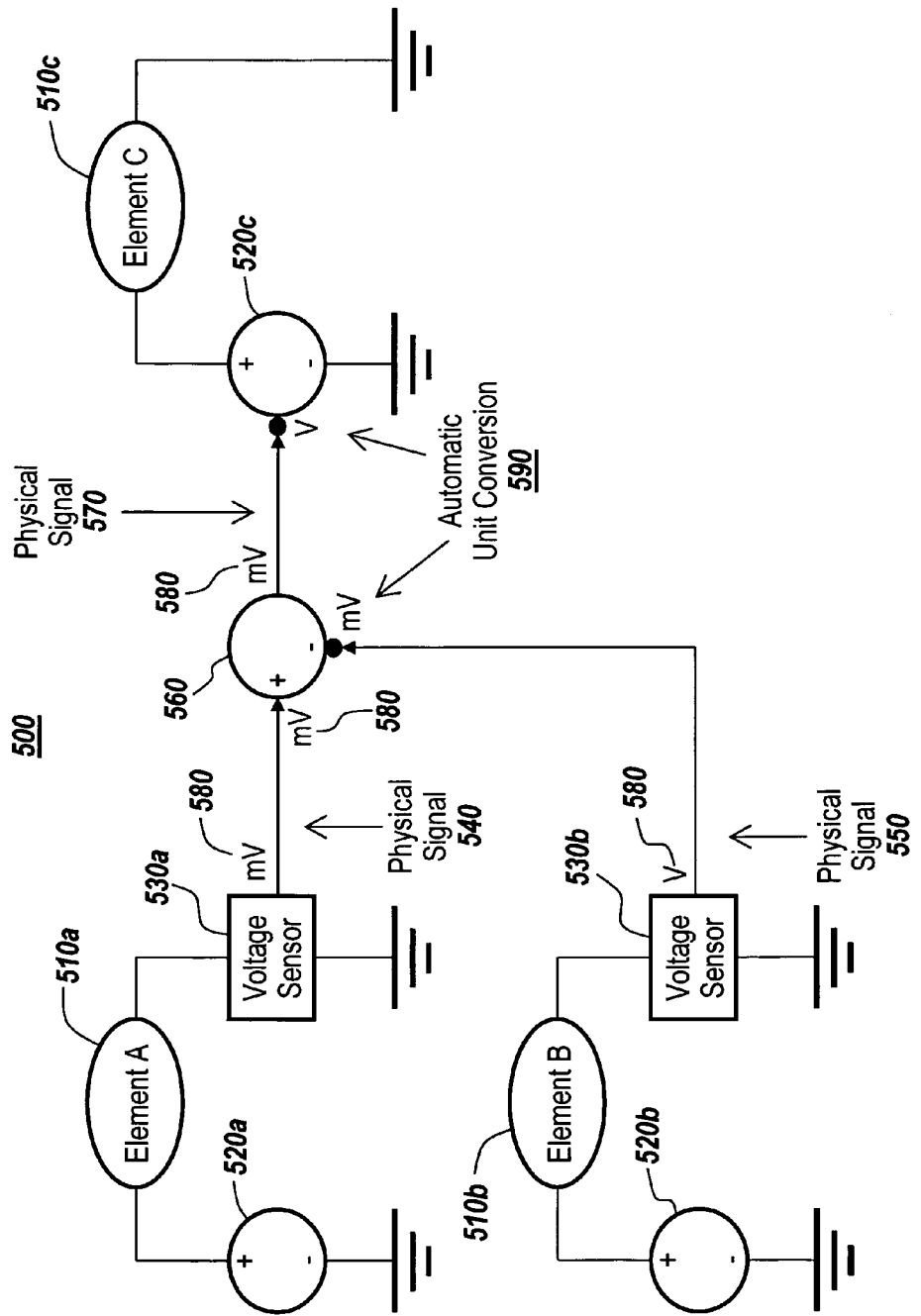
FIG. 5 is an example of a graphical model of physical system having intrinsic units of measure.

An example of a graphical model 500 of a physical system having intrinsic units of measure can be seen in FIG. 5. Here the graphical model has elements A, B, and C (510a, 510b, 510c). Element A 510a is connected to a power supply 520a and a voltage sensor 530a. Element B 510b is also connected to a power supply 520b and a voltage sensor 530b. The voltage sensor 530a connected to element A 510a outputs a signal 540 having a voltage in millivolts (mV). The voltage sensor 530b connected to element B 510a outputs a signal 550 having a voltage in volts (V). The voltage of signal 550 is subtracted from the voltage of signal 540 at differentiator 560. In subtracting the voltage of signal 550 from the voltage of signal 540 the volts (V) of signal 550 are converted to millivolts (mV). The difference between the voltages of signal 540 and signal 550 is outputted on signal 570 in millivolts (mV). The millivolts (mV) of signal 570 are converted to volts (V) to power element C 510c.

As can be seen in this example, units of measure 580 may be indicated on the graphical model. Here, voltage is propagated through the system, and is converted as necessary based on the requirements of elements of the system. Each element may have a base unit 580 specified for it which may b indicated in the graphical model, such as volts (V) or millivolts (mV). Thus any commensurate units the element receives are converted to the specified base unit. In some embodiments as shown here, there may be graphical indication 590 that autoconversion is performed. Here, auto conversion is indicated 590 on the input ports of the differentiator 560 and power supply 520c. In other embodiments, the base unit all other commensurate units are converted to may be specified globally for the whole system or sub-globally for referenced models or subsystems.

Figure 6:
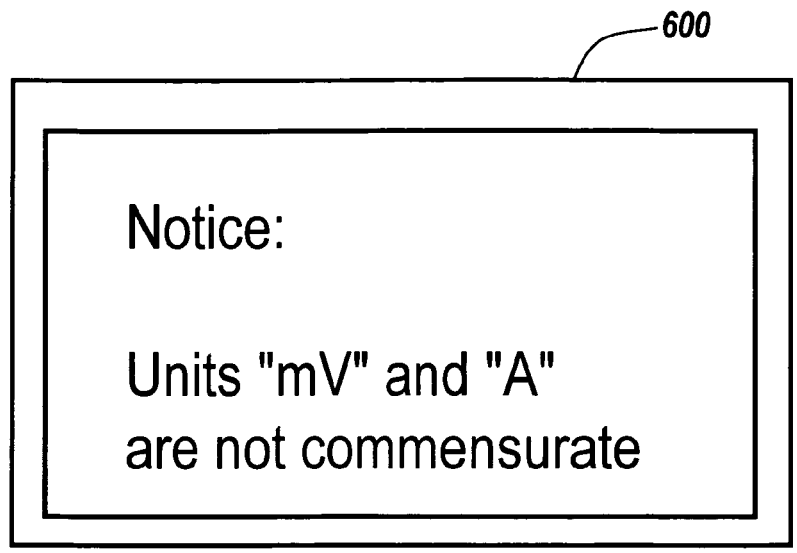
FIG. 6 is an exemplary notification generated when operands are not commensurate.

In certain embodiments where a provided or specified units are not commensurate, the system may generate or otherwise provide notice of non-commensurate units. For example, in FIG. 5 if voltage sensor 530b were replaced with a current sensor that outputs a signal having a current in amperes, or amps, (A) the user may receive a notice 600 as seen in FIG. 6. Here, the notice 600 is a window that indicates that that units "mV" and "A" are not commensurate because the differentiator 560 cannot subtract current, in amps (A) from voltage, in millivolts (mV). In certain embodiments, the user may then be prompted or solicited as to how to address the non-commensurate units.

Propagation of units and in turn checking for commensurate units is beneficial in that it helps eliminate errors when executing a model of a physical system. Without units of measure assigned to values it can be extremely difficult to determine if or why generated results are not correct for a system.

Figure 7:
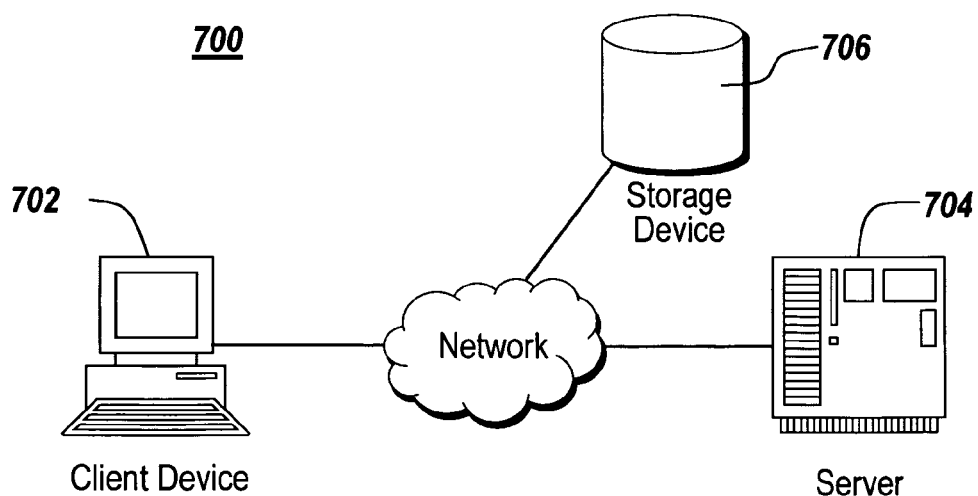
FIG. 7 illustrates a client-server environment suitable for practicing an illustrative embodiment of the present invention.

The examples to this point have focused primarily on the system where the graphical modeling environment was on a local computing device. The graphical modeling environment may, of course, also be implemented on a network 700, as illustrated in FIG. 7, having a server 704 and a client device 702. Other devices, such as a storage device 706, may also be connected to the network.

In one such embodiment a system for generating and displaying a graphical modeling application, comprises a distribution server for providing to a client device, intrinsic units of measure for modeling physical systems; and a client device in communication with the distribution server. Here the distribution server provides a client device, such as an computing device discussed above, with intrinsic units of measure. The intrinsic units may be part of a database available to the client on the server. The intrinsic units may also be part of blocks or other graphical elements available to the client on the server. The blocks or graphical elements may be configured to receive input with intrinsic units of measure and/or provide outputs having intrinsic units of measure. The client may then use the intrinsic units of measure for modeling physical systems.

In another embodiment, the server may execute the physical modeling environment. A user may then interact with the physical modeling environment on the server through the client device. In one example of such a system, a server and client device are provided. The server is capable of executing a physical modeling environment, wherein the physical modeling environment provides intrinsic units of measure for modeling physical systems. The client device is in communication with the server over a network. Values having intrinsic units of measure are then provided, from the client to the server, for a model of a physical system. The systems may then be modeled and the results outputted from the server to the client device.

It will be understood by one skilled in the art that these network embodiments are exemplary and that the functionality may be divided up in any number of ways over a network.

The proceeding examples have focused primarily on models of physical systems in the electrical domain but it will be apparent to one skilled in the art that there are numerous other domains, systems, fields and applications the present invention would be suitable. Some examples include but are not limited to, models in the mechanical and chemical domains.

The present invention has been described relative to illustrative embodiments. Since certain changes may be made in the above constructions without departing from the scope of the invention, it is intended that all matter contained in the above description or shown in the accompanying drawings be interpreted as illustrative and not in a limiting sense.

It is also to be understood that the following claims are to cover all generic and specific features of the invention described herein, and all statements of the scope of the invention which, as a matter of language, might be said to fall therebetween.

What is claimed is:

1. A system for generating and displaying a physical modeling application, comprising:
    a user-operable input device for inputting data to the physical modeling application;
    a display device displaying a graphical physical model; and
    a computing device including memory for storing computer program instructions and data, and a processor for executing the stored computer program instructions, the computer program instructions including:
        instructions for registering intrinsic units of measure in a database or registry,
        instructions for graphically modeling a physical system having at least one of the intrinsic units of measure registered in the database or registry,
        instructions for propagating the at least one of the intrinsic units of measure registered in the database or registry through the graphical physical model, and
        instructions for generating executable code for the graphical physical model.

2. The system of claim 1, further comprising:
    a distribution server for providing the intrinsic units of measure to a client device; and
    the client device in communication with the distribution server.

3. The system of claim 2, wherein the client device graphically models the physical system having the at least one of the intrinsic units of measure.

4. The system of claim 2, wherein the client device is the computing device.

5. A computing device implemented method performed in a network, the network having a server and a client device in communication with the server, the method comprising:
    registering intrinsic units of measure in a database or registry, the database or registry being located at the server;
    receiving, at the server from the client device, input having units of measure;
    graphically modeling a physical system having at least one of the intrinsic units of measure registered in the database or registry in a physical modeling environment;
    propagating the at least one of the intrinsic units of measure registered in the database or registry through the graphical model of the physical system; and
    saving the graphical model of the physical system on a storage device.

* * * * *